United States Patent [19]

Ishibe et al.

[11] 3,898,201
[45] Aug. 5, 1975

[54] NOVEL RESINS AND MANUFACTURING THE SAME

[75] Inventors: Shuhei Ishibe, Nara; Toshiharu Okumichi, Amagasaki; Keizo Matsumoto, Osaka, all of Japan

[73] Assignee: Arakawa Rinsan Kagaku Kogyo Kabushiki Kaisha, Osaka, Japan

[22] Filed: Feb. 25, 1974

[21] Appl. No.: 445,099

[30] Foreign Application Priority Data
Feb. 28, 1973 Japan.............................. 48-24549
Mar. 1, 1973 Japan.............................. 48-25414

[52] U.S. Cl.... 260/78.4 R; 260/78.4 N; 260/78.4 E
[51] Int. Cl.² .................. C08F 22/02; C08F 22/12; C08F 22/30; C08F 22/04
[58] Field of Search ...... 260/78.4 N, 78.4 R, 78.4 E

[56] References Cited
UNITED STATES PATENTS
3,299,184   1/1967   Whitworth ..................... 260/78.4 R
3,364,191   1/1968   Donaldson ........................ 260/93.7

*Primary Examiner*—Joseph L. Schofer
*Assistant Examiner*—Maria S. Tungol
*Attorney, Agent, or Firm*—Bierman & Bierman

[57] ABSTRACT

A process for manufacturing a resin which comprises reacting in the presence of a Friedel-Crafts catalyst, a Diels-Alder addition product with a benzene derivative, said Diels-Alder addition product is a compound having a formula of

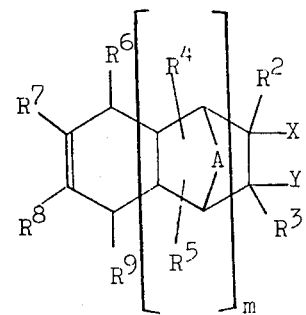

or

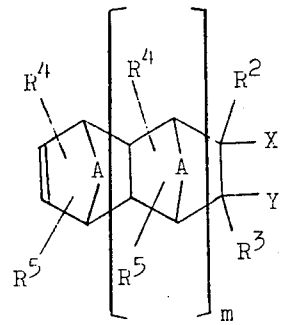

wherein each of $R^2$, $R^3$, $R^4$ and $R^5$ is a hydrogen atom or methyl group, each of $R^6$, $R^7$, $R^8$ and $R^9$ is a hydrogen atom or alkyl group having one to four carbon atoms, each of X and Y is —COOH, —COOR" or —CN or X and Y represent an acid anhydride ring formed by being bonded together, R" being an alkyl group having one to four carbon atoms, A is —$CH_2$— or —$CH_2CH_2$—, and $m$ is zero or an integer of 1 or 2; said resin being useful as substitutes for rosin and its derivatives.

14 Claims, No Drawings

NOVEL RESINS AND MANUFACTURING THE SAME

This invention relates to novel resins and a method for producing the same. More particularly, the invention relates to compositions useful as sizing agents and emulsifiers for the emulsion polymerization of synthetic rubbers.

Conventionally, rosin and its derivatives have been employed not only as emulsifiers for synthetic rubbers and sizing agents for paper making but also for versatile uses as tackifiers for pressure-sensitive adhesives, hot-melt compositions and various rubbers and as resins for coating compositions and printing inks.

For example, alkali salts of the rosin derivative obtained by the disproportionation or hydrogenation of rosin to make the conjugated double bond inactive are extensively used as emulsifiers for emulsion polymerization in producing styrene-butadiene rubber, acrylonitrile-butadiene-styrene rubber and like synthetic rubbers, because the rosin derivative used as an emulsifier has the characteristics of promoting the polymerization reaction and improving the amenability of the resulting synthetic rubbers to processing and their tackiness.

Furthermore when an alkali salt of rosin or rosin derivative such as fortified rosin is added in a small amount to a pulp suspension in paper making process, such compound imparts writing property and sizing effect to the paper obtained. Thus rosin and its derivatives are widely used as essential additives in the paper making industry.

Rosin has further properties of being soluble in many kinds of solvents and compatible with versatile high polymers. The softening point of rosin can be varied as desired and its compatibility with various materials can be improved by modification with metal compounds, alcohols, polybasic acids, phenolic resins, etc. Moreover, when mixed with other materials, rosin imparts tackiness to the materials. Accordingly, rosin or its derivatives are used extensively as a tackifier for pressure sensitive adhesives, hotmelt compositions and various rubbers and also as a resin for coating compositions, printing inks and floor tiles.

Because of these outstanding properties exhibited in a wide variety of applications, rosin is very useful as an industrial material. However, since it is a naturally occuring material, its supply is not stable and there is no possibility of increased production. Accordingly, it has become an important problem to synthesize resins having properties similar to those of rosin and its derivatives.

A main object of the invention is to provide a novel rosin-like resin having properties and characteristics similar to those of rosin and usable as a substitute for rosin as well as derivatives thereof.

Another object of the invention is to provide a process for manufacturing a rosin-like resin having the above properties and characteristics from materials easily available on a commercial scale.

Another object of the invention is to provide a composition containing novel rosin-like resins which can be used for a wide variety of purposes as substitutes for compositions containing rosin or its derivatives, such as emulsifiers for producing synthetic rubber by emulsion polymerization, sizing compositions for paper, pressure sensitive adhesives, hotmelt adhesives, coating compositions, printing inks and the like.

Another object of the invention is to provide a sizing composition for paper, which displays more excellent sizing effect as compared not only with conventional rosin sizes but also with fortified rosin sizes.

Another object of the invention is to provide an emulsifying composition for producing synthetic rubber by emulsion polymerization, which is similar to or superior to conventional emulsifiers containing disproportionated rosin.

These and other advantages and objects of the present invention will be apparent from the following description.

According to this invention the objective resin is prepared by reacting in the presence of Friedel-Crafts catalyst a Diels-Alder addition product with a benzene derivative having the formula of

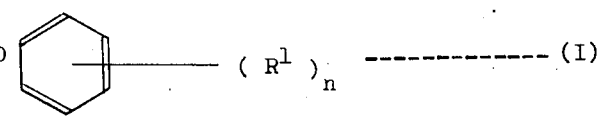

wherein $R^1$ is an alkyl group having one to 18 carbon atoms and $n$ is zero or an integer of 1 to 5; said Diels-Alder addition product being at least one of (a) compounds having the formula of

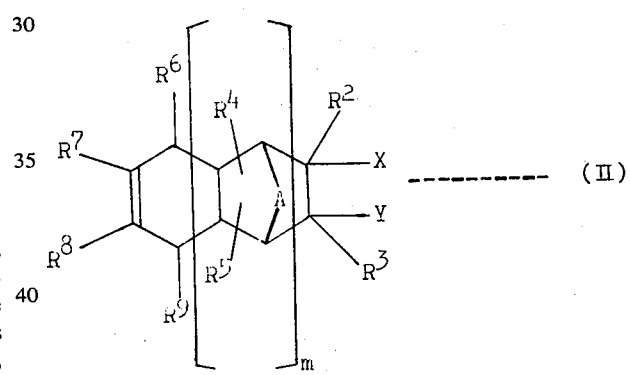

wherein each of $R^2$, $R^3$, $R^4$ and $R^5$ is a hydrogen atom or methyl group, each of $R^6$, $R^7$, $R^8$ and $R^9$ is a hydrogen atom or alkyl group having one to four carbon atoms, each of X and Y is —COOH, —COOR$^a$ or —CN or X and Y represent an acid anhydride ring formed by being bonded together, $R^a$ being an alkyl group having one to four carbon atoms, A is —CH$_2$— or —CH$_2$CH$_2$—, and $m$ is zero or an integer of 1 or 2, and (b) compounds having the formula of

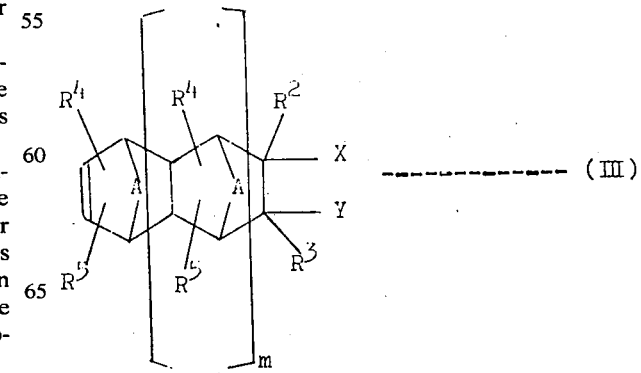

wherein $R^2$, $R^3$, $R^4$, $R^5$, X, Y, A and $m$ are the same as defined above.

The benzene derivatives to be used in the invention are those having the formula (I) above. Examples thereof are benzene, toluene, xylene, ethylbenzene, methylethylbenzene, cumene, cymene, trimethylbenzene, tetramethylbenzene, butylbenzene, hexylbenzene, octylbenzene, dodecylbenzene and the like. Of these preferable are those having the formula (I) in which $n$ is zero or an integer of 1 or 2.

The Diels-Alder addition products having the formulas (II) and (III) above are known compounds and can be easily prepared. Preferable methods for producing the addition products (II) and (III) are as follows:

1. Products having the formulas (II) and (III) in which $m$ is zero can be prepared by equimolar Diels-Alder addition reactions of α, β-unsaturated dibasic acid derivatives with conjugated dienes as shown by the following equations:

clic dienes (V) or with conjugated cyclic dienes (VI) is usually conducted in an open or closed reactor at a temperature of 10° to 250°C, preferably 10° to 200°C. The reaction atmosphere is preferably inert gas atmosphere such as nitrogen, and atmospheric, autogenous or increased pressure is applicable to the reaction. The α, β-unsaturated dibasic acid derivative (IV) is preferably used in an amount of 0.5 to 2.0 moles per mole of the conjugated diene (V) or (VI). If necessary, organic solvents such as benzene, toluene, xylene, n-hexane, cyclohexane, etc., can be employed. The reaction is usually completed within 5 minutes to 20 hours in accordance with the reaction conditions applied. The resulting 1 : 1 molar addition product (II - a) or (III - a) can be separated from the reaction mixture by distilling off the unreacted reactants and solvents, if any. Further, the product (II - a) or (III - a) itself can be isolated by distillation under reduced pressure.

2. Products having the formula (II) in which m is 1

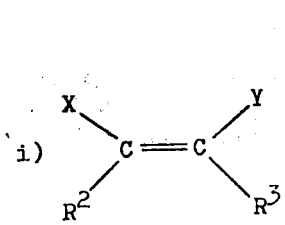 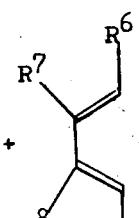 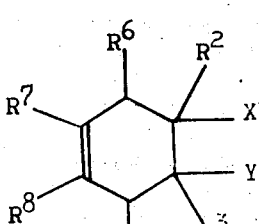

(IV)　　　　　　(V)　　　　　　　　(II - a)

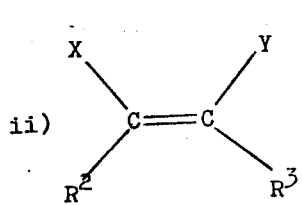 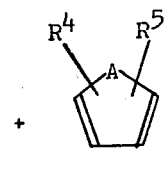 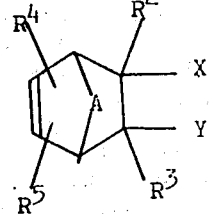

(IV)　　　　　　(VI)　　　　　　　　(III - a)

wherein $R^2$ to $R^9$, X, Y and A are the same as defined before.

The Diels-Alder reaction (i) or (ii) of α, β-unsaturated dibasic acid derivatives (IV) with conjugated acyclic dienes (V) or with conjugated cyclic dienes (VI)

can be prepared by equimolar Diels-Alder addition reaction of addition products (III - a) obtained by the method (1) above with conjugated acyclic dienes as shown by the following equation:

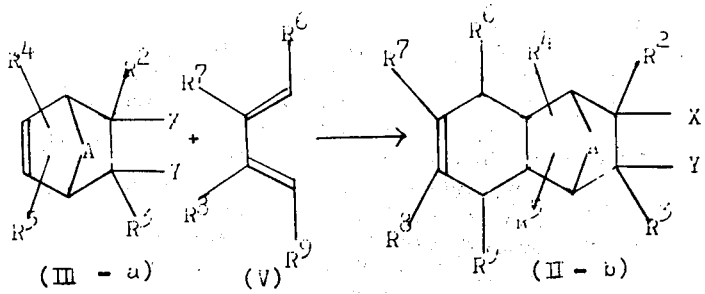

(III - a)　　　　(V)　　　　　　(II - b)

wherein $R^2$ to $R^9$, A, X and Y are the same as defined before.

The above Diels-Alder reaction between addition product (III - a) and conjugated acyclic diene (V) is usually conducted in a closed reactor at a temperature of 100° to 300°C, preferably 150° to 250°C. Inert gas atmosphere such as nitrogen is preferable and autogenous or increased pressure is applicable. The conjugated acyclic diene (V) is used in an amount of 0.5 to 2.0 moles per mole of the addition product (III - a). If necessary, organic solvents can be used. The reaction is usually completed within 0.5 to 10 hours depending on the reaction conditions applied. The resulting Diels-Alder addition product (II - b) can be separated from the reaction mixture by distilling off the unreacted reactants and solvents, if any.

3. Products having the formula (III) in which $m$ is 1 can be prepared by 1 : 2 molar Diels-Alder addition reaction of $\alpha, \beta$-unsaturated dibasic acid derivatives with conjugated cyclic dienes as shown by the following equations:

tion conditions are the same as those described in the method (2) above. The resulting addition product (III - b) can be separated from the reaction mixture by distilling off the unreacted reactants and solvents, if any.

4. Products having the formula (II) in which $m$ is 2 can be prepared by equimolar Diels-Alder addition reaction of addition products (III - b) obtained by the method (3) above with conjugated acyclic dienes as shown by the following equation.

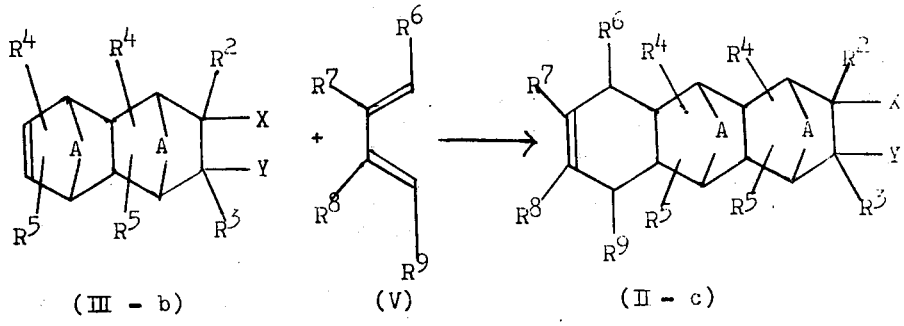

wherein $R^2$ to $R^9$, X, Y and A are the same as defined before.

In this reaction the conjugated acyclic diene (V) is used in an amount of 0.5 to 1.5 moles per mole of the addition product (III - b). The reaction conditions are the same as described in method (2) above. The resulting reaction product (II - c) can be separated from the reaction mixture by distilling off the unreacted reactants and solvents, if any.

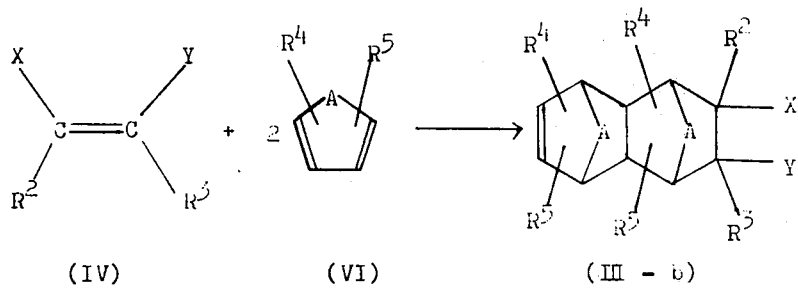

wherein $R^2$ to $R^5$, X, Y and A are the same as defined before.

In this reaction the conjugated cyclic diene (VI) is used in an amount of 1.5 to 2.5 moles per mole of the $\alpha, \beta$-unsaturated dibasic acid derivative (IV). The reac- 5. Products having the formula (III) in which $m$ is 2 can be prepared by 1 : 3 molar Diels-Alder addition reaction of $\alpha, \beta$-unsaturated dibasic acid derivatives (IV) with conjugated cyclic dienes (VI) as shown by the following equation:

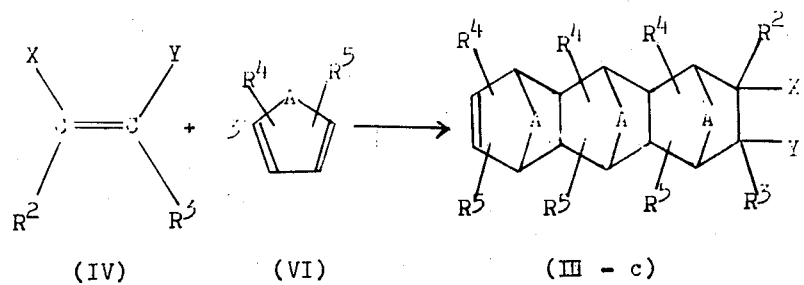

wherein $R^2$ to $R^5$, X, Y and A are the same as defined before.

In this reaction the conjugated cyclic diene (VI) is usually used in an amount of 2.5 to 3.5 moles per mole of the α, β-unsaturated dibasic acid derivative (IV). The reaction conditions are the same as described in the method (2) above. The resulting product (III - c) can be separated from the reaction mixture by distilling off the unreacted reactants and solvents, if any.

A mixture containing any of addition products (II - b), (II - c), (III - b) and (III - c) may be prepared by Diels-Alder reaction of products (III - a) and/or (III - b) with a mixture of acyclic dienes (V) and cyclic dienes (VI).

The α, β-unsaturated dibasic acid derivatives (IV) to be used in the above methods (1) to (5) include, for example, maleic acid, fumaric acid, citraconic acid and like α, β-unsaturated dibasic acids, and mono- or di-alkyl esters, mono- or di-nitriles and acid anhydrides thereof. Preferable are maleic anhydride, dimethylmaleate and dimethylfumarate.

The conjugated dienes to be used include conjugated acyclic dienes (V) and conjugated cyclic dienes (VI). Examples of the former are butadiene, 2-methyl-1,3-butadiene (isoprene), 1,3-pentadiene (piperylene), 2-methyl-1,3-pentadiene, 1,3-hexadiene, 2,4-hexadiene, 2,4-heptadiene, etc. Examples of the latter are cyclopentadiene, methylcyclopentadiene, 1,3-cyclohexadiene, etc. Dimers or codimers of these dienes which produce the corresponding mono-dienes under the reaction conditions are also employable. Of these preferable are butadiene, isoprene, piperylene, cyclopentadiene, methylcyclopentadiene and dicyclopentadiene. These conjugated dienes can be used alone or in admixture with one another. For example, petroleum fractions obtained by cracking of naphtha and containing these dienes in mixture can be used for the purpose.

In the Friedel-Crafts reaction to produce the present resin the starting addition products (II) and (III) can be used in a purified form or crude form obtained merely by removing unreacted reactants and solvents, if any, from the reaction mixture. Preferable addition products are those having the formulas of

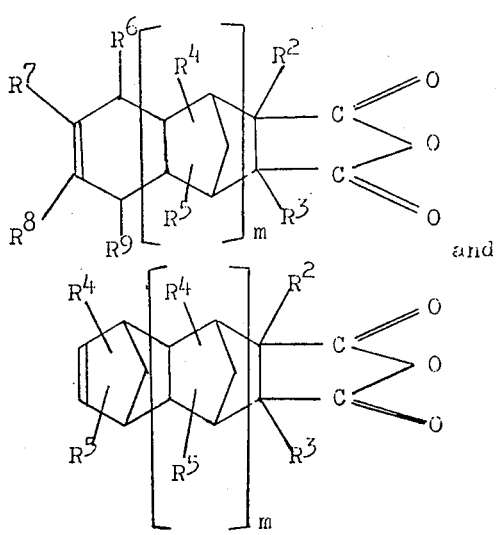

wherein $R^2$ to $R^9$ and m are the same as defined before.
The most preferable are those having the formulas of

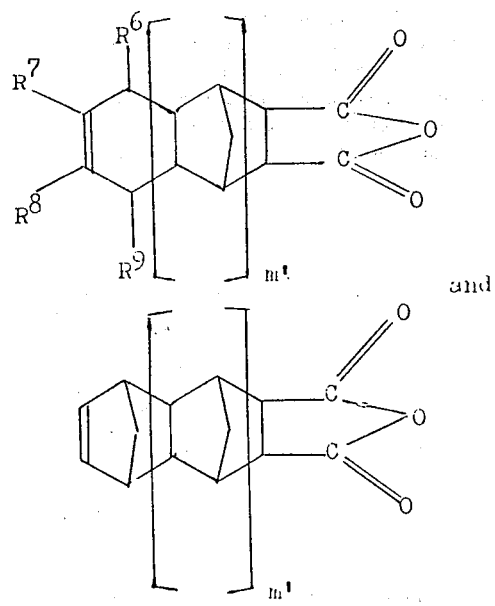

wherein $R^6$ to $R^9$ are the same as defined before and m' is 0 or 1.

Another starting material, i.e., benzene derivative (I) is used alone or in mixture in an amount of at least 0.5 mole per mole of the addition product (II) or (III) to be used. Since the benzene derivative (I) serves as a solvent in the reaction, it can be employed in a large excess amount, e.g., 20 times mole per mole of the addition product (II) or (III). Preferable amount of the benzene derivative (1) is in the range of 3 to 10 moles per mole of the addition compound.

The reaction between the benzene compound (I) with addition compound (II) or (III) to produce the resin of the invention is carried out in the presence of a Friedel-Crafts catalyst. The Friedel-Crafts catalysts to be used are those conventional in the art and include, for example, hydrogen fluoride, phosphoric acid, sulfuric acid, boron trifluoride, boron trifluoride-etherate, boron trifluoride-phenolate, aluminum trichloride, aluminum tribromide, tin tetrachloride, zinc chloride, activated clay, silica-alumina, etc. Preferable are sulfuric acid, boron trifluoride, boron trifluoride-etherate, boron trifluoride-phenolate and aluminum trichloride. The amount of the catalyst to be used may vary over a wide range depending on the catalyst, starting materials, reaction conditions and the like, but usually it is in the range of 0.5 to 100 wt%, based on the weight of the starting addition product (II) or (III).

The Friedel-Crafts reaction to produce the present resin is carried out in an open or closed reactor at a temperature of 0° to 300°C, preferably at 20° to 200°C. If necessary, the reaction may be conducted in an inert gas atmosphere such as nitrogen. Although increased pressure is applicable, the reaction is usually conducted under atmospheric or autogenous pressures. The reaction is usually completed within 1 to 10 hours.

After the reaction, the catalyst used is inactivated with water, acid or alkali and removed by filtration and/or washing with water. Thereafter, the reaction mixture is distilled to remove unreacted substances and solvents, if any, whereby the present resin is obtained as a residue.

The resin thus obtained is a Friedel-Crafts reaction product of the starting benzene derivative (I) and addition product (II) or (III) and has groups represented by X and Y contained in the latter starting material, but the exact structure thereof has not been made clear yet, since various reactions are involved depending on the starting materials used, catalysts used, etc. Usually alkylation reaction proceeds selectively, but acylation reaction also occurs under a certain condition. For example, when an addition product (II - a) or (III - a) having an acid anhydride ring formed by X and Y is reacted with a benzene derivative (I) in the presence of aluminum trihalide, alkylation and/or acylation reactions occur. In fact it has been found that the resin contains not only 1 : 1 molar reaction product but also 2 : 1 molar reaction product of benzene derivative (I) and Diels-Alder addition product (II) or (III) depending on the reaction conditions applied. Further, the resin may contain a small amount of a 1 : 2 molar reaction product of benzene derivative (I) and addition product (II) or (III), depending on the reaction conditions. The resin of the invention may be a mixture of the above products, but irrespective of whether the resin obtained by the present invention is such mixture or not, it displays useful properties similar to those of rosin and its derivatives and can be used as a substitute for rosin and its derivatives. Therefore, there is no need to separate these products from one another.

If necessary, the resin thus obtained is subjected to hydrolysis to produce the resin acid or alkali metal salt thereof having one or two carboxyl groups neutralized or not neutralized with alkali. The hydrolysis can be conducted in a conventional manner. When the resin derived from the addition product having the formula (II) or (III) in which at least one of X and Y is —CN or —COOR" (R" being as defined before) or X and Y represent an acid anhydride ring formed by being bonded together is hydrolyzed in the presence or absence of acid, the resin acid having one or two carboxyl groups in the molecule can be obtained. The resin acid salt can be obtained by neutralizing with an alkali metal hydroxide a resin acid thus obtained having one or two carboxyl groups in the molecule. When the hydrolysis is conducted in the presence of an alkali metal hydroxide, moreover, resin acid salt having one or two carboxyl groups neutralized with the alkali can be obtained. The alkali metal hydroxide to be used for neutralization includes, for example, sodium hydroxide, potassium hydroxide and the like.

The present resin containing one or two carboxyl groups neutralized or not neutralized with alkali has properties similar to those of rosin or its derivatives.

1. The present resin having one or two carboxyl groups is easily dispersable in alkaline aqueous solution to produce alkaline aqueous dispersion which is stable and has both hydrophilic and hydrophobic properties. Therefore, the dispersion displays excellent sizing effect for paper and emulsifying effect. These effects can be obtained by reacting the addition product (II) or (III) with benzene derivative (I) in the presence of Friedel-Crafts catalysts. The addition product (II) or (III) itself is poor or insufficient in these effects.

2. The resin is excellent in resistance to light and heat, since it has substantially no reactive carbon-carbon double bond in alicyclic ring due to the addition of benzene derivative. Further the resin can be easily modified to desired form, utilizing the reactive groups represented by X and Y contained therein.

3. The resin has a peculiar property capable of imparting tackiness to various materials and further can be easily modified with alcohols, metal compounds, epoxy compounds or phenolic resins, utilizing reactive carboxyl groups contained therein in accordance with the uses to be desired. Therefore, it can be employed in various uses like rosin or its derivatives, for example, as tackifiers for natural and synthetic rubbers, hotmelt compositions, etc., and resins for paints, printing inks, floor tiles, road marking compositions, etc.

For a better understanding of the invention examples are given below.

EXAMPLE 1

588 g of maleic anhydride and 990 g of benzene were placed into a three-liter four-necked flask equipped with a reflux condenser, dropping funnel and thermometer. While keeping the mixture at a temperature of 30° to 40°C with stirring, 396 g of cyclopentadiene was added dropwise to the mixture over a period of 2 hours. Subsequently, the resulting mixture was heated to 80°C, maintained for 30 minutes at this temperature and then cooled. Removal of unreacted substances gave 868 g of 1 : 1 molar addition product of a cyclopentadiene and maleic anhydride, which had an acid value of 668 (theoretical value: 684).

280 g of xylene and 56.7 g of anhydrous aluminum chloride were placed into a 1-liter four-necked flask equipped with a stirrer and thermometer. While keeping the mixture at 50°C with stirring, 70 g of the addition product was slowly added to effect further reaction at 80°C for 3 hours.

The reaction mixture was thereafter cooled, followed by addition of dilute hydrochloric acid to inactivate the catalyst, which was then removed by filtration and washing with water. Unreacted substances and solvent were distilled off from the xylene layer at a reduced pressure to obtain 122.7 g of a pasty resin having an acid value of 187.1.

EXAMPLE 2

100 g of dicyclopentadiene and 246 g of the addition product obtained in Example 1 were placed into a 1-liter autoclave, and the interior air was replaced by nitrogen gas. The reaction system was thereafter reacted at 190° to 200°C for 3 hours and then cooled. At a reduced pressure, a distillate at 154°C/2 mm Hg or lower was removed to obtain 289 g of 2 : 1 molar cyclopentadiene-maleic anhydride addition product

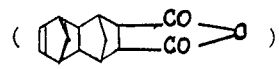

having an acid value of 470 (theoretical value: 488).

200 g of cumene and 50 g of the above-mentioned addition product were placed into a 1-liter four-necked flask. 14.6 g of 97% sulfuric acid was slowly added dropwise to the mixture with stirring while maintaining the mixture at 50°C, followed by heating to 110°C to effect reaction at this temperature for 3 hours. After the reaction, the reaction mixture was cooled and washed with water to remove the catalyst. Unreacted substances were distilled off at a reduced pressure to obtain 55.6 g of a resin having a softening point of 80.5°C and a saponification value of 286.5.

EXAMPLE 3

225 g of dicyclopentadiene (3.4 moles as cyclopentadiene), 167 g (1.7 moles) of maleic anhydride and 392 g of xylene were placed into a 1-liter stainless steel autoclave with an electromagnetic stirrer, and the interior air was replaced by nitrogen gas. The mixture was thereafter heated to 220°C and reacted with stirring for 3 hours. After cooling the reaction mixture, xylene was removed by distillation, followed by further distillation at a reduced pressure of 2mm Hg until the bottom temperature reached 200°C to distill off unreacted dicyclopentadiene and 1 : 1 molar addition product

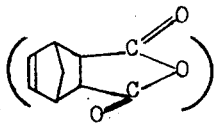

of cyclopentadiene/maleic anhydride to obtain 254 g of a distillate at 190° to 220°C/2 mm Hg, which was found to be a 2 : 1 molar addition product

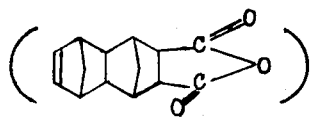

of cyclopentadiene/maleic anhydride having an acid value of 470 (theoretical acid value 488).

230 g of the above-mentioned addition product and 460 g of xylene were placed into a 1-liter four-necked flask having a stirrer and thermometer. After dissolving the mixture uniformly, 4.6 g of boron trifluoride phenolate was slowly added to the solution, and the resulting mixture was reacted at 80°C for 3 hours. To the reaction mixture thereafter cooled was added 13.8 g of a mixture of water and calcium hydroxide (1:3 in weight ratio) to inactivate the catalyst. The inactivated catalyst was then removed by filtration. Unreacted substances and xylene were distilled off from the filtrate to obtain 277 g of a resin having a softening point of 88°C and an acid value of 327 (theoretical value: 334).

EXAMPLE 4

To a 1-liter autoclave were placed 280 g of 20° to 38°C fraction of thermally cracked naphtha having the following composition and 250 g of the addition product obtained in Example 1, and the interior air was replaced by nitrogen gas. The mixture was then reacted at 250°C for 5 hours. After the completion of reaction, the mixture was cooled and distilled at a reduced pressure to remove unreacted substances and a fraction at 150°C/1–2 mm Hg or lower and to thereby obtain 301 g of the mixture of 1:1 molar addition product of cyclopentadiene-maleic anhydride addition product obtained in Example 1 and conjugated dienes shown below. The resin thus obtained had an acid value of 342. The composition of naphtha used

| | |
|---|---|
| cyclopentadiene and cis-1,3-pentadiene | 15.7 wt. % |
| isoprene | 14.1 |
| trans-1,3-pentadiene | 8.4 |
| others (free from conjugated dienes) | 61.8 |

200 g of ethylbenzene and 7.3 g of anhydrous aluminum chloride were placed into a 1-liter fournecked flask. While heating the mixture at 50°C with stirring, 50 g of the above-mentioned addition product in molten state was slowly added to the mixture. After the completion of addition, the resulting mixture was stirred at 80°C for 3 hours. Dilute hydrochloric acid was added to the reaction mixture obtained to decompose the catalyst, followed by filtration and washing with water. Unreacted materials were then distilled off from the ethylbenzene layer to obtain 53.0 g of a resin having a softening point of 74.5°C and an acid value of 272.

EXAMPLE 5

To a 1-liter autoclave were placed 50 g of the addition product of conjugated dienes and cyclopentadiene-maleic anhydride addition product, obtained in Example 4, 200 g of xylene and 1.9 g of boron trifluoride etherate, and the interior air was replaced by nitrogen gas. The mixture was stirred at 200°C for 3 hours.

Water was added to the resulting reaction mixture thereafter cooled to decompose the catalyst, and resulting precipitate was filtered off. The filtrate was then washed with water. Through the distillation of xylene layer at a reduced pressure, unreacted substances were removed to obtain 56.6 g of a resin having a softening point of 77°C and an acid value of 271.

EXAMPLE 6

50 g of isoprene-maleic anhydride addition product obtained in the same manner as in Example 1 except that 408 g of isoprene was used in place of cyclopentadiene was slowly placed into a 1-liter four-necked flask maintained at a temperature of 50°C and containing 200 g of p-cymene and 39.9 g of anhydrous aluminum chloride. The mixture was stirred at 80°C for 3 hours.

The same procedure as in Example 1 was thereafter followed to remove the catalyst and unreacted substances and to thereby obtain 58.1 g of a pasty resin having an acid value of 200.

EXAMPLE 7

55.4 g of a pasty resin having an acid value of 218 was obtained in the same manner as in Example 6 except that 408 g of piperylene was used in place of isoprene and that p-cymene was replaced by cumene.

EXAMPLE 8

Into a 1-liter four-necked flask equipped with a stirrer, thermometer and reflux condenser were placed 50 g of 2:1 molar addition product of cyclopentadiene/maleic anhydride

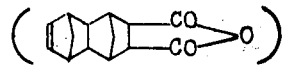

obtained in Example 2 and 200 g of dodecylbenzene, and 3.6 g of boron trifluoride phenolate was further added. The mixture was then kept at 140°C.

The mixture was treated in the same manner as in Example 3 to obtain 79.2 g of a resin having a softening point of 59.0°C and an acid value of 221 (theoretical value: 236).

EXAMPLE 9

52.5 g of a resin having a softening point of 81.0°C and an acid value of 303 was obtained in the same manner as in Example 8 except that 50 g of a cyclopentadiene-maleic acid addition product prepared by hydrolysis of the cyclopentadiene-maleic anhydride addition product of Example 2, 200 g of xylene and 1.9 g of an ether complex of boron trifluoride were used.

EXAMPLE 10

472 g of 2 : 1 molar addition product of cyclopentadiene-maleic anhydride

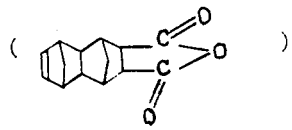

was placed into a 1-liter autoclave, and the interior air was replaced by nitrogen gas, followed by heating to 220°C. Subsequently, 140 g of isoprene was added to the system to effect reaction for 3 hours. The resulting reaction mixture was subjected to distillation to remove unreacted substances and by-products to obtain 251 g of a fraction at 250° to 262°C/5 mm Hg represented by
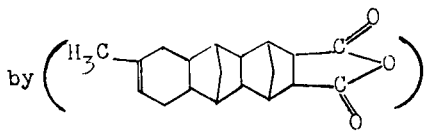

and having an acid value of 371 (theoretical value : 376).

50 g of the addition product and 200 g of xylene were placed into a 1-liter four-necked flask and dissolved. 1.5 g of boron trifluoride phenolate was slowly added to the solution. The mixture obtained was heated to 80°C and reacted at this temperature for 3 hours. The reaction mixture thus prepared was distilled to remove unreacted substances to obtain 54.2 g of a resin having an acid value of 269 (theoretical value : 278).

EXAMPLE 11

Into a 1-liter flask were placed 200 g of methanol and 50 g of the 2 : 1 molar addition product of cyclopentadiene/maleic anhydride obtained in Example 3, which were reacted at the reflux temperature for 2 hours. The resulting reaction mixture was distilled to remove the methanol to obtain 56.5 g of half methyl ester

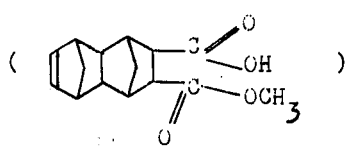

of the above-mentioned addition product.

50 g of the half ester thus obtained and 200 g of xylene were placed into a four-necked flask and dissolved uniformly. 8.5 g of boron trifluoride etherate was further added slowly. The mixture was then reacted at 80°C for 3 hours. The resulting reaction mixture was cooled, and water was added thereto to decompose the catalyst, followed by filtration to remove precipitate and washing with water. Unreacted substances were distilled off from the xylene layer at a reduced pressure to obtain 46.6 g of a resin having a softening point of 89°C and an acid value of 142. (theoretical value : 152).

The resins obtained in the above examples were tested in respect of their applications as sizing compositions and as emulsifiers for emulsion polymerization of synthetic rubbers according to the following methods with the results given below.

Each of the resins of examples 1 to 5, rosin and fortified rosin was neutralized with potassium hydroxide in an equimolar amount relative to the acid value of the resin to prepare a 25 wt.% aqueous solution thereof.

1. Sizing composition and sizing effect

Each of the compositions obtained above was used as a sizing composition was added to a 1 wt.% slurry of pulp (LBKP) having a beating degree of 30° SR. An aqueous solution of aluminum sulfate was further added to and uniformly dispersed in the slurry in an amount of 2.5 wt.% based on the dry pulp and calculated as solids. Using a TAPPI Standard Sheet Machine, the resulting slurry was made at 20°C into paper weighing 65 ± 1 g/m². The paper was dried at 100°C for 5 minutes and conditioned at 20°C and 65% RH. The sizing effect given to the paper was determined according to Stöckigt method (JIS P 8122).

The test results are given in Table 1.

Table 1

| Sizing composition | | Sizing effect Sizing effect (in seconds) | |
|---|---|---|---|
| No. | Resin | Amount*2 used: (wt.%) 0.3 | 0.5 |
| 1 | Example 1 | 23.8 | 27.1 |
| 2 | Example 2 | 25.7 | 29.4 |
| 3 | Example 3 | 28.3 | 33.5 |
| 4 | Example 4 | 26.0 | 31.0 |
| 5 | Example 5 | 26.6 | 33.1 |
| 6 | *1 | 27.6 | 33.1 |
| 7 | Rosin | 20.5 | 27.3 |
| 8 | Fortified rosin | 24.3 | 29.2 |

*1 The resin No. 6 is a mixture of rosin having a softening point of 76°C and an acid value of 172 and the resin of Example 2 in the weight ratio of 8 : 2.
*2 The amount of sizing composition is percent in solid weight, based on the pulp.

Table 1 shows the following:

The sizing compositions of this invention produce better results than rosin sizing composition and are equivalent or superior to the fortified rosin sizing composition. The resin of Example 2 produces an effect similar to that of the rosin modified with maleic anhydride in the fortified rosin (No.8).

2. Emulsifying composition

Each of the aqueous compositions of the resins obtained in Examples 3 and 4 was used as an emulsifier for emulsion polymerization according to cold rubber sulfoxylate formulation shown in Table 2 to obtain SBR. The conversion and stability of latex are respectively shown in Tables 3 and 4.

Table 2

| Materials used | Names of materials used | Proportions parts by weight |
|---|---|---|
| Monomer | Butadiene | 70 |
| | Styrene | 30 |
| Dispersing medium | Deionized water (degassed) | 200 |
| Emulsifier | Aqueous solution of resin of Examples (as solid) | 4.0 |
| | Naphthalene-formaldehyde resin sodium sulfonate | 0.15 |

Table 2-Continued

| Materials used | Names of materials used | Proportions parts by weight |
|---|---|---|
| Molecular weight adjusting agent | Tertiary dodecylmercaptan | 0.1 |
| Polymerization initiator | | |
| Oxidizing agent | p-Menthane hydroperoxide | 0.08 |
| Reducing agent | Ferrous sulfate (heptahydrate) | 0.0125 |
| Secondary reducing agent | Sodium formaldehyde sulfoxylate | 0.15 |
| Chelating agent | EDTA - 4Na | 0.07 |
| Electrolyte | Sodium phosphate (dodecahydrate) | 0.8 |

Polymerization conditions
  Polymerization temperature : 5°C.
  Reaction time : 9 hours.
  In nitrogen atmosphere.
Conversion Table 3 gives conversion, in which is also shown that obtained in exactly the same manner as above, using a commercial disproportionated rosin emulsifier.

Table 3

| Emulsifier | Conversion (%) |
|---|---|
| Example 3 | 58.0 |
| Example 4 | 53.3 |
| Commercial disproportionated rosin emulsifier | 61.5 |

Stability test of latex 50 g of 25 wt.% aqueous solution of the latex obtained in the above polymerization was placed in a container and subjected to mechanical shearing force at a temperature of 25°C for 5 minutes, under a load of 5 kg and at a rotational speed of 1,000 r.p.m. The resulting coagulation was filtered by an 80-mesh stainless screen and dried to determine the rate of the coagulation formed.

$$\text{Rate of coagulation formed (\%)} = \frac{\text{Weight of coagulation dried}}{12.5} \times 100$$

The smaller the rate of coagulation formed, the more stable is the latex.

Table 4 shows the result in comparison with that obtained with the use of the commercial disproportionated rosin emulsifier.

Table 4

| Emulsifier | Rate of coagulation formed (%) |
|---|---|
| Example 3 | 1.4 |
| Example 4 | 1.3 |
| Commercial disproportionated rosin emulsifier | 1.5 |

What we claim is:

1. A process for manufacturing a resin which comprises reacting in the presence of a Friedel-Crafts catalyst a Diels-Alder addition product with a benzene derivative having a formula of

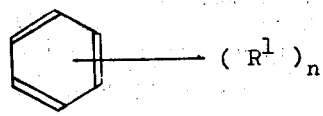

wherein $R^1$ is an alkyl group having one to 18 carbon atoms and $n$ is zero or an integer of 1 to 5; said Diels-Alder addition product is at least one of (a) compounds having a formula of

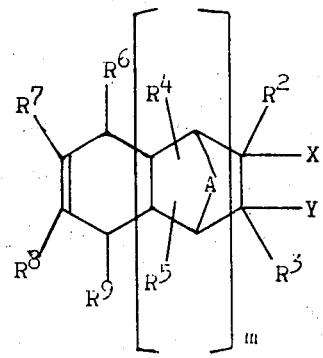

wherein each of $R^2$, $R^3$, $R^4$ and $R^5$ is a hydrogen atom or methyl group, each of $R^6$, $R^7$, $R^8$ and $R^9$ is a hydrogen atom or alkyl group having one to four carbon atoms, each of X and Y is —COOH, —COOR$^a$ or —CN or X and Y represent an acid anhydride ring formed by being bonded together, $R^a$ being an alkyl group having one to four carbon atoms, A is —CH$_2$— or —CH$_2$CH$_2$—, and $m$ is zero or an integer of 1 or 2, and (b) compounds having the formula of

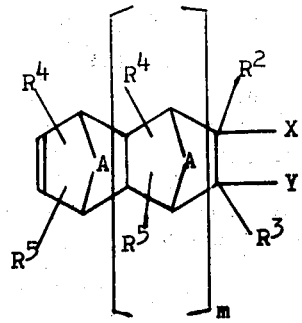

wherein $R^2$, $R^3$, $R^4$, $R^5$, X, Y, A and $m$ are the same as defined above.

2. A process according to claim 1 in which said Diels-Alder addition product has the formula of

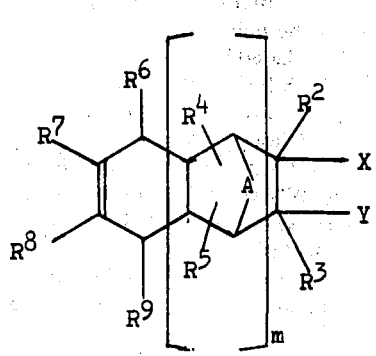

wherein each of $R^2$, $R^3$, $R^4$ and $R^5$ is a hydrogen atom or methyl group, each of $R^6$, $R^7$, $R^8$ and $R^9$ is a hydrogen atom or alkyl group having one to four carbon atoms, each of X and Y is —COOH, —COOR$^a$ or —CN or X and Y represent an acid anhydride ring formed by being bonded together, $R^a$ being an alkyl group having one to four carbon atoms, A is —CH$_2$— or —CH$_2$CH$_2$—, and $m$ is zero or an integer of 1 or 2.

3. A process according to claim 1 in which said Diels-Alder addition product has the formula of

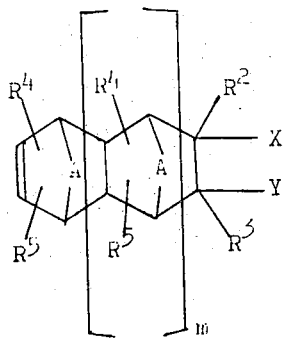

wherein each of $R^2$, $R^3$, $R^4$ and $R^5$ is a hydrogen atom or methyl group, each of X and Y is —COOH, —COOR$^a$ or —CN or X and Y represent an acid anhydride ring formed by being bonded together, $R^a$ being an alkyl group having one to four carbon atoms, A is —CH$_2$— or —CH$_2$CH$_2$—, and $m$ is zero or an integer of 1 or 2.

4. A process according to claim 1 in which said m is zero.

5. A process according to claim 1 in which said m is 1.

6. A process according to claim 1 in which said m is 2.

7. A process according to claim 1, in which at least one of said X and Y is —COOR$^a$ or —CN or said X and Y represent an acid anhydride ring formed by being bonded together, $R^a$ being an alkyl group having one to four carbon atoms, and the resulting resin is hydrolyzed to produce a resin acid.

8. A process according to claim 1 in which at least one of said X and Y is —COOH and the resulting resin is neutralized with an alkali metal hydroxide to produce a resin acid salt.

9. A process according to claim 1, in which said benzene has said formula in which $n$ is zero or an integer of 1 or 2.

10. A process according to claim 1 wherein X and Y are bonded together to form an acid anhydride ring.

11. A process according to claim 2 in which said $R^2$ to $R^5$ are hydrogen atoms, X and Y represent an acid anhydride ring formed by being bonded together, A is —CH$_2$— and $m$ is zero or 1.

12. A process according to claim 3 in which said $R^2$ to $R^5$ are hydrogen atoms, X and Y represent an acid anhydride ring formed by being bonded together, A is —CH$_2$— and $m$ is zero or 1.

13. A resin obtained by the method claimed in claim 1 and an alkali metal salt thereof.

14. A resin obtained by the method of claim 10 and an alkali metal salt thereof.

* * * * *